United States Patent

[11] 3,591,713

[72] Inventors Tore Bertil Reinhold Olsson; Ake Valentin Nilsson, both of Karlskoga, Sweden
[21] Appl. No. 784,601
[22] Filed Dec. 18, 1968
[45] Patented July 6, 1971
[73] Assignee Aktiebolaget Bofors Bofors, Sweden
[32] Priority Dec. 22, 1967
[33] Sweden
[31] 17,741/1967

[54] THERMOGRAPHY EQUIPMENT FOR PRODUCING A DIRECTLY OBSERVABLE THERMAL PICTURE
3 Claims, 3 Drawing Figs.

[52] U.S. Cl. .......... 178/6.8, 178/6
[51] Int. Cl. .......... H04n 5/22, H04n 7/02, H04n 7/18
[50] Field of Search .......... 178/6.8, 6; 128/2

[56] References Cited

UNITED STATES PATENTS 3,354,266 11/1967 Dinenno .......... 178/6.8
3,371,160 2/1968 Hurford .......... 178/6 F&M
3,465,097 9/1969 Brabon .......... 178/6 F&M

*Primary Examiner*—Bernard Konick
*Assistant Examiner*—Howard W. Britton
*Attorney*—Hane and Baxley

ABSTRACT: A signal transmission system for passing signals from the detector to the intensity modulating electrode of a picture tube in a thermography equipment of the type in which a "heat picture" of the depicted object is produced on the screen of a cathode-ray tube. The system includes a normal video channel and an additional channel for producing a so-called thermal band. Switching means are provided for simultaneously connecting a limiting device into the normal video channel and connecting the additional channel in parallel with the normal channel. The limiting device limits the output signals from the normal channel to a level below the constant maximum level of the output pulses from the additional channel. A gate is included in the normal channel and is controlled by the output pulses from the additional channel so as to block the normal channel, when output pulses appear in the additional channel.

INVENTORS
TORE BERTIL REINHOLD OLSSON
ÅKE VALENTIN NILSSON
BY
Hane and Baxley
ATTORNEYS

THERMOGRAPHY EQUIPMENT FOR PRODUCING A DIRECTLY OBSERVABLE THERMAL PICTURE

BACKGROUND OF THE INVENTION

The invention relates to a thermography equipment of the kind which comprises a camera with scanning means for pointwise scanning the field of view of the camera and for directing the infrared radiation received from each point towards a detector which produces a signal with a strength depending on the intensity of the received radiation, a picture tube of the cathode-ray tube combined with sweep means for causing the electron beam to sweep over the picture screen of the tube in synchronism with the scanning means of the camera, and signal transmission means including amplifiers for passing the signals from the detector to intensity modulating means in the picture tube. A picture built up in the same manner as a television picture is then obtained on the screen of the picture tube, and the light intensities of different parts of the picture are dependent on the temperature of the corresponding parts of the depicted object. Thus, the picture can be said to be a thermal picture of the object.

The signal transmission means between the detector and the intensity modulating means of the picture tube comprise a video amplifier the output voltage of which varies in substantially the same way as the input voltage, so that the picture obtained on the screen of the picture tube is what may be called a normal thermal picture in which the light intensity in each point of the picture is larger the larger the temperature is in the corresponding point on the object. Hereby a thermal picture is obtained in which the intensity distribution corresponds fairly well to the temperature distribution on the surface of the depicted object.

It is known to provide the equipment, in addition to the aforementioned signal transmission channel including the normal video amplifier, with an additional signal transmission channel between the detector and the intensity modulating means of the picture tube. This additional transmission channel which is optionally connectable in parallel with the normal transmission channel, comprises means for transmitting and amplifying only such signals whose level lies within predetermined limits corresponding to the limits of a certain temperature interval which may be very small. To this end, the additional transmission channel comprises level-sensing means arranged so that an output signal is delivered from this channel only when the level of the input signal lies between the said predetermined limits. This output signal is applied together with the output signal from the normal transmission channel to the intensity modulating means of the picture tube. The gain of the level-sensing amplifier is so chosen that the output signals from this amplifier produces a highly increased light intensity in the corresponding points on the picture screen, so that those areas of the object which have a temperature within the said interval will appear on the thermal picture with a larger brightness than areas having temperatures outside this interval.

In the following description the said temperature interval as well as the interval between the corresponding signal levels and the corresponding areas on the picture will be named "the thermal band."

The level-sensing means in the transmission channel for the thermal band are adjustable so that the position of the thermal band within the total temperature range can be varied. The adjusting means for setting the position of the thermal band may be calibrated which makes it possible to determine temperature differences between two separate points or areas on the object.

The previously known devices for producing a thermal band in a thermography equipment of this kind suffer from certain drawbacks. Thus, it may occur that signals corresponding to temperatures outside the thermal band are so strong that they produce points or areas on the picture having about the same brightness as the thermal band in which case it is difficult or impossible to distinguish these points or areas from those points or areas which are covered by the thermal band. It is possible to eliminate this drawback by reducing the brightness of the normal thermal picture by means of adjusting devices connected to the normal video amplifier, but this leads to the consequence that only the warmest areas of the object will appear clearly on the thermal picture, which makes it difficult to identify the different areas of the picture. It is desirable that the thermal band shall always have the same brightness independent of the position of the thermal band within the total temperature range. In the known devices for producing the thermal band, however, the signals from the transmission channel for the thermal band are added to the signals from the normal transmission channel, and therefore the brightness of the thermal band on the thermal picture becomes dependent of the absolute temperature of the corresponding areas of the object.

OBJECTS AND SUMMARY OF THE INVENTION

It is an object of the invention to eliminate these drawbacks. Thus, the invention relates to a thermography equipment of the kind mentioned above which comprises a first transmission channel for transmitting signals from the detector to the intensity modulating means of the picture tube and comprising a video amplifier for producing an output signal varying in substantially the same way as the input signal, and a second transmission channel which is optionally connectable in parallel with the first transmission channel and comprises means for transmitting and amplifying only those signals which have a level lying within predetermined limits. According to the invention the equipment further comprises a limiting device which can be connected to the first transmission channel at the same time as the second transmission channel is connected, the said limiting means being adapted to limit the output signal from the first transmission channel to a maximum level which is below the level of the output signal from the second transmission channel, and the first transmission channel is provided with switching means controlled by output signals from the second transmission channel in such manner that the first transmission channel is blocked when an output signal appears from the second transmission channel.

This device ensures that the thermal band will always appear with greater brightness than other parts of the normal heat picture. Also the thermal band will always have the same brightness since the normal transmission channel is blocked when signals for the thermal band appear, so that the thermal band signals are applied alone to the intensity modulating means of the picture tube. It is assumed that the output signals from the transmission channel for the thermal band have a constant amplitude independent of the position of the thermal band within the total temperature range.

DRAWINGS AND DETAILED DESCRIPTION

The invention will now be described more in particular with reference to the accompanying drawing.

In the FIGS. only such parts have been shown that are necessary for the understanding of the invention.

Figure 1:
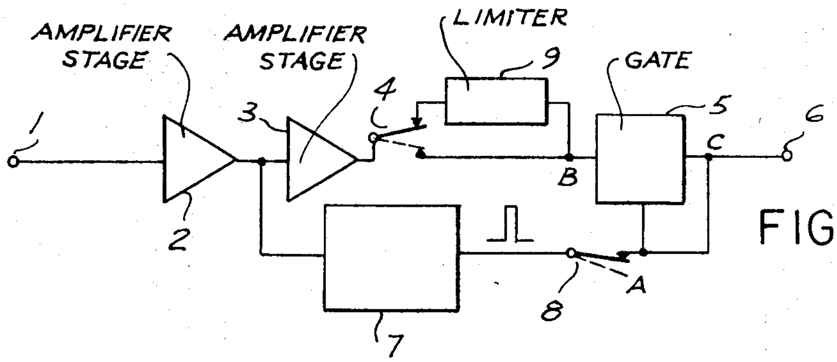
FIG. 1 shows a block diagram of an embodiment of the invention.

In the device shown in FIG. 1 point 1 is connected to the output from a preamplifier the input of which is connected to the detector. Point 6 is connected to the intensity modulating electrode of a picture tube. The transmission channel for the normal video signal comprises in addition to the aforementioned preamplifier (not shown) the intermediate amplifying stages 2 and 3. The output of the amplifying stage 3 is connected to a two-position switch 4 by means of which the amplifier output can be alternately connected to a limiting device 9 or directly to the signal input of a gate 5. The output from gate 5 is connected to point 6, that is to the intensity modulating electrode of the picture tube.

The input of the transmission channel for the thermal band is connected to the output from the amplifying stage 2. This transmission channel includes the said level-sensing means and amplifying and limiting means. All these means are assumed to be of known kind, and in FIG. 1 they are jointly symbolized by the rectangle 7. PUlses of equal amplitude appear at the output from the unit 7 when the level of the input signal lies within predetermined limits. The output of the unit 7 is connected to a switch 8. When the switch 8 is in the position indicated by the full line, it connects the output of the unit 7 directly to point 6 and also to a control input of gate 5. When switch 8 is in the position indicated by the dotted line, the transmission channel for the thermal band is interrupted and put out of function. The switches 4 and 8 are preferably operated by means of a common control member.

Figure 2:
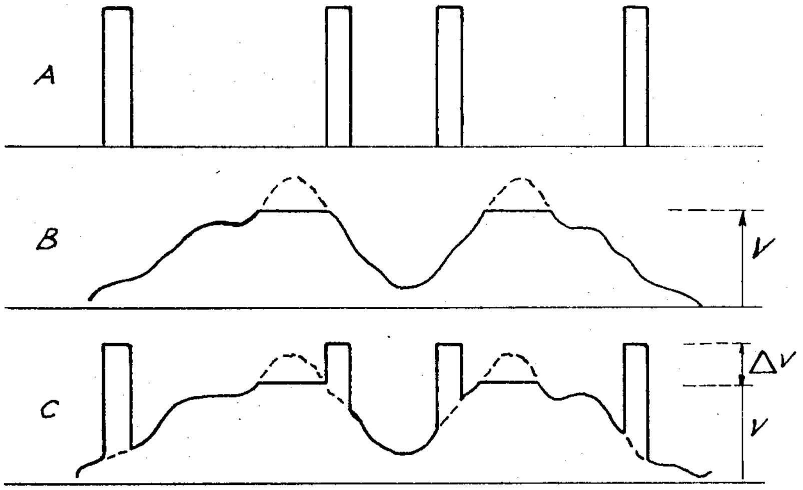
FIG. 2 shows diagrams of the signal voltage as function of time in three different points in the device shown in FIG. 1.

When the switches 4 and 8 are in the position indicated by full lines, pulses representing the thermal band appear at point A in FIG. 1. These pulses are shown at A in FIG. 2. At the same time a voltage appears at point B which is shown at B in FIG. 2 by the full line. This voltage is the normal video signal, but it is limited by the limiting device 9 so that it can never exceed a certain level indicated by V in FIG. 2. If the switch 4 had been in the position indicated by the dotted line, that is if the limiting device had been ineffective, the voltage at point B might exceed the level V as indicated by dotted lines in FIG. 2.

The pulses A from the transmission channel for the thermal band actuate the gate 5 so that this is closed during the duration of each pulse A. Then the normal video signal B (FIG. 2) cannot pass through gate 5, and the intensity modulating means of the picture tube which are connected to point 6 are then actuated only by the pulses A. The voltage at point C in FIG. 1 will then vary as shown by the full lines at C in FIG. 2. The voltage difference $\Delta V$ between the limiting level V of the video signal and the amplitude of pulses A is made so large that the thermal band on the picture tube will be clearly distinguished from other parts of the picture.

Figure 3:
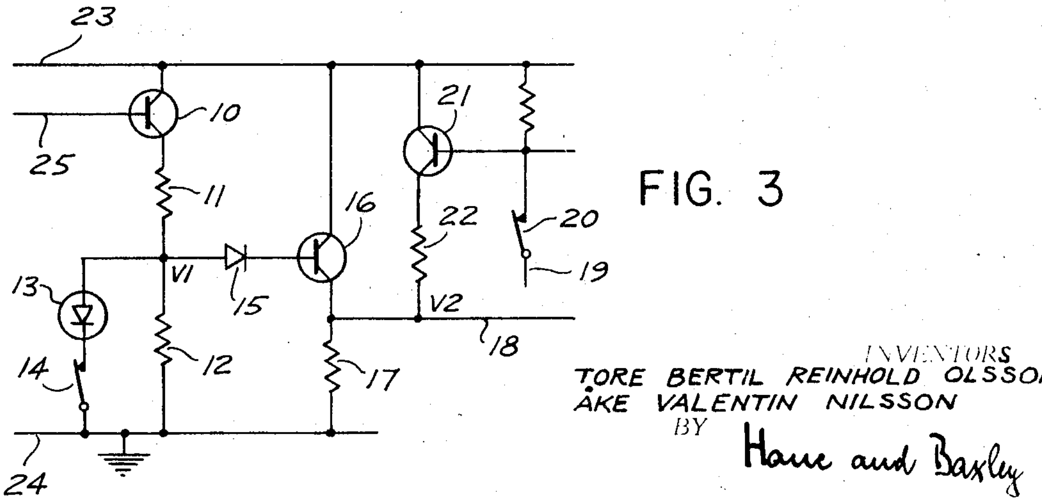
FIG. 3 shows a circuit diagram of an embodiment of the limiting and blocking means in the device according to the invention.

FIG. 3 shows more in detail in simple embodiment of the devices for limiting and blocking the video signal when the thermal band is utilized.

The normal video signal is applied over line 25 to the base of a transistor 10. The output signal from this transistor is taken from the junction between two resistor 11 and 12 which form a voltage divider in series with the emitter of transistor 10. From here the signal is applied over a rectifier 15 to the base of a second transistor 16, and from this transistor the signal is passed over line 18 to the intensity modulating means of the picture tube. A zener diode in series with a contact 14 is connected in parallel with the resistor 12. When contact 14 is closed the voltage V1 at the junction point between resistors 11 and 12 will not be able to exceed a certain level determined by the zener voltage of diode 13.

The resistor 17 which is included in the emitter circuit of transistor 16 forms together with resistor 22 a voltage divider in series with a third transistor 21. The base of transistor 21 is connectable by means of contact 20 to line 19 which is connected to the output of the transmission channel for the thermal band. When contact 20 is closed and pulses (A in FIG. 2) are applied to the base of transistor 21 from the line 19, a corresponding voltage V2 appears at the junction point between resistors 22 and 17. The resistances of resistors 11—12 and 22—17 respectively are so chosen that the voltage V2 is larger than the largest value that the voltage V1 can assume when transistor 14 is conductive. Contact 14 is closed at the same time as contact 20, and then the voltage V1 can be at most equal to the zener voltage of diode 13. Since V2 is larger than V1, transistor 16 will be cut off each time as a pulse appears on line 19, and in such case the signal V1 cannot be forwarded to line 18.

The required operating direct voltage for the transistors in the circuit shown in FIG. 3 is applied over lines 23 and 24.

The device shown and described above is given by way of example only and can be modified in many ways within the scope of the invention.

We claim:

1. Arrangement in thermography equipment of the kind comprising a camera with scanning means for pointwise scanning the field of view of the camera and directing the received infrared radiation towards a detector which produces a signal the strength of which varies with the intensity of the received radiation, a picture tube of the cathode-ray type combined with sweep means for causing the electron beam in the picture tube to sweep across the picture screen of the tube in synchronism with the scanning means of the camera, a first transmission channel including an amplifying stage for passing the signals from the detector to intensity modulating means in the picture tube, said first transmission channel comprising a video amplifier for producing an output signal varying in substantially the same way as the input signal, and a second transmission channel which is optionally connectable in parallel with the first transmission channel and comprises means for transmitting and amplifying only such signals whose level lies within predetermined limits, characterized in that further comprises a limiting device which is connectable to the first transmission channel at the same time as the second transmission channel is connected, said limiting device including means for limiting the output signal from the first transmission channel to a maximum level which lies below the level of the output signal from the second transmission channel, and that the first transmission channel is provided with switching means, controlled by output signals from the second transmission channel, for preventing transmission of signals from the first transmission channel when an output signal appears in the second transmission channel.

2. An arrangement as claimed in claim 1, characterized in that the limiting device comprises a zener diode which is connectable across the output of the amplifying stage in the first transmission channel.

3. An arrangement as claimed in claim 1, characterized in that said switching means comprises a normally open electronic gate which is adapted to be closed by output signals from the second transmission channel.